Nov. 27, 1928.
F. J. OVEN
1,692,857
METALLIC GASKET
Filed April 17, 1925
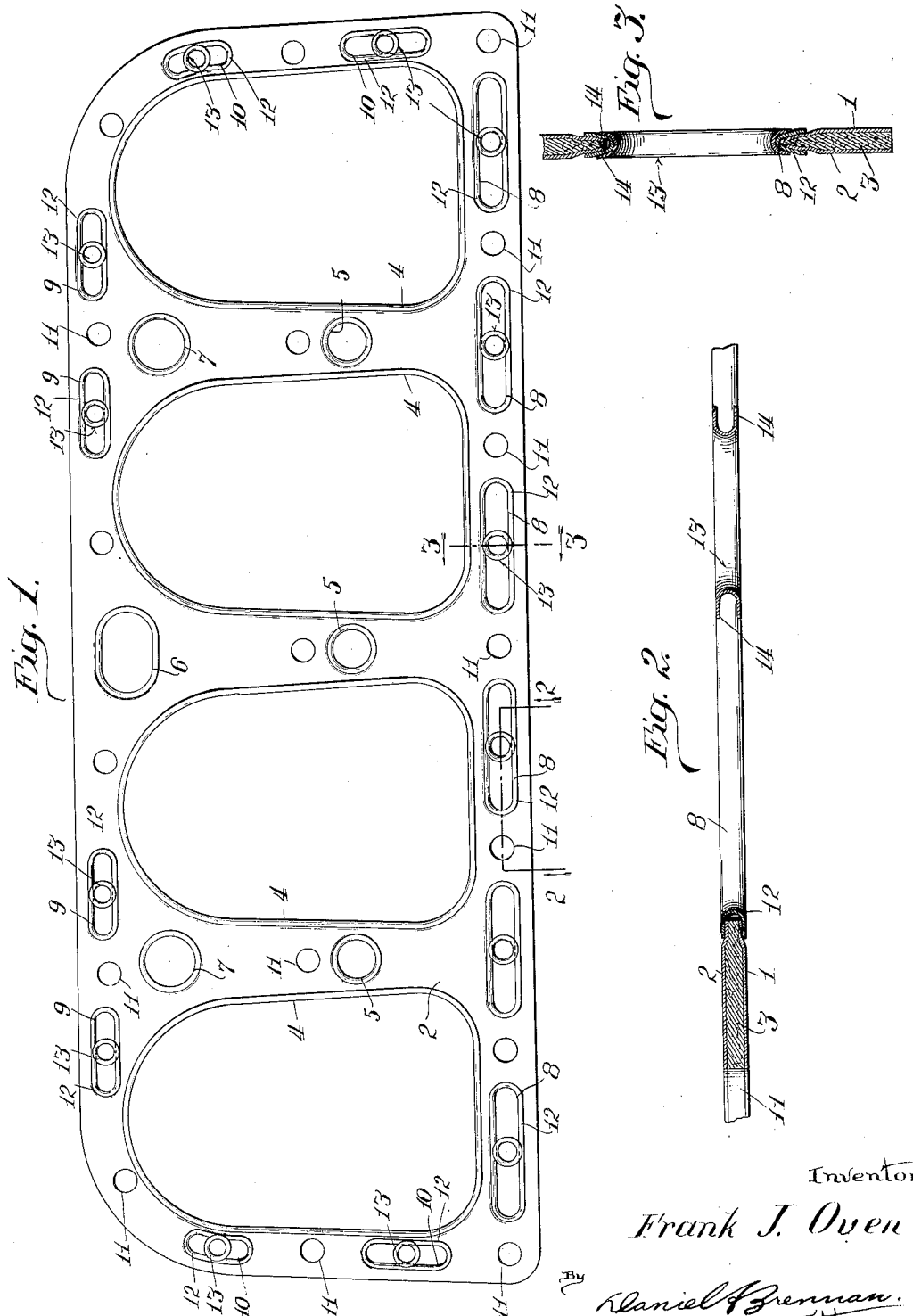
Inventor
Frank J. Oven
By Daniel F Brennan
Attorney Patented Nov. 27, 1928.

1,692,857

UNITED STATES PATENT OFFICE.

FRANK J. OVEN, OF CHICAGO, ILLINOIS, ASSIGNOR TO VICTOR MANUFACTURING & GASKET CO., A CORPORATION OF ILLINOIS.

METALLIC GASKET.

Application filed April 17, 1925. Serial No. 23,867.

This invention relates to improvements in metallic gaskets and it is an object of the invention to provide means in a gasket of this character for assuring a predetermined area for the flow of any liquid through openings in the gasket.

Gaskets of this character are frequently used on internal combustion engines between the cylinder heads and the bodies of the cylinder, and openings must be provided at various places in the gasket to permit the cooling fluid to pass all around the cylinders. Since the gasket must be very firmly compressed it frequently happened that the openings in the gasket provided for the passage of the cooling fluids were distorted or deformed so as to interfere materially with the free flow of the fluids. This danger of decreasing the area of the flow is mainly imminent in openings of non-circular shape and particularly in openings resembling elongated slots, where the longitudinal edges were sometimes drawn together owing to the pressure exerted on the gasket. This danger is avoided in the present application by inserting into the openings of the gasket braces which will prevent the contraction of the gasket at these openings without, however, materially interfering with the flow of the liquid through these non-circular openings.

With these and other objects in view, an embodiment of the invention is illustrated in the accompanying drawings and is described in the following specification, the novel advantages being pointed out in the appended claims. In the drawing:

Fig. 1 is a top plan view of a gasket of this character;

Fig. 2 is a section on line 2—2 of Fig. 1, on a larger scale, and

Fig. 3 is a section on line 3—3 of Fig. 1, also on a larger scale.

The gasket, as shown by way of example in the accompanying drawing, is one of those gaskets which may be built up of several layers, as for instance an inner and outer layer 1 and 2 respectively of very thin, tough metal,—sheet bronze, copper or the like,—and an inner layer 3 of non-metallic but heat-resisting material, as for instance asbestos.

Depending upon the formation of that surface on which the gasket is to be placed, this gasket is provided with several openings, as for instance relatively large openings 4 which may communicate with the cylinders and valve casings of a combustion engine. In addition to these relatively large openings 4 there are provided openings 5, 6 and 7 serving for the conduit of some cooling fluid, as for instance, the cooling water which circulates thru the openings 5 and 6 in the interspace between adjacent cylinders (not shown) and which also is to be conducted in circulation through the jacket (not shown) of the entire plurality of cylinders. The openings in the gasket through which the fluid circulating about the jacket is to flow are relatively narrow or non-circular, as indicated at 8, 9 or 10 respectively.

Upon positioning the gasket on the combustion engine, as for instance by screws (not shown) passing through the openings 11, it might happen that the relatively narrow openings 8, 9 and 10 are distorted so that for instance the openings would be contracted and the flow of the medium through the distorted opening or openings would be greatly interfered with. This danger is averted by inserting into these narrow openings or slots in the gasket means which will prevent the collapse or distortion of the openings or which will prevent in general any deformation of the area of these openings.

As will be seen from Figs. 2 and 3, the gasket is reinforced along the edges of the various openings through which the fluids are to pass by means of flanges 12 which are bent at their margins over the inner and outer layers 1 and 2 respectively and which are firmly pressed into engagement with these layers, whereby the portion of the gasket adjacent the margin of these openings does not exceed in thickness that portion of the gasket which is remote from the opening. This reinforcement greatly assists in the maintenance of the openings in registration and also will assist in preventing any deformation of the area of these openings.

A further means, however, for preventing any deformation of the area is provided by bracing elements 13 which are inserted into the elongated openings 8, 9 or 10 between opposite points, preferably along the longitudinal edges of these elongated openings, and these bracing elements are constructed in such manner as not to interfere with the passage of the fluid through the various elongated openings. They are, therefore, constructed in the present instance as ferrules or eyelets 13 made of thin sheet metal of U-shaped cross-section, as indicated in Figs. 2 and 3, the flanges 14 of the material bent to U-shaped cross-section being brought into direct engagement with the reinforcing flanges 12 confining these openings. The danger of restricting the area of these openings is thereby eliminated without, however, interfering to any extent with the free flow of the circulating fluid through the openings.

I claim:

1. A gasket having a metallic inner and outer layer and an intermediate layer of non-metallic material, the layers being provided with registering openings extending through the gasket, reinforcing rings with flanges inserted into said openings, and means for bracing opposite walls of said flanges.

2. A gasket provided with a plurality of openings, having reinforcing rings with flanges circumferentially seated in said openings and means spanning said openings to engage spaced points on said rings for preventing the deformation of said openings.

3. A gasket having a plurality of non-circular openings in the form of elongated slots, reinforcing rings with flanges seated in said slot, and means inserted in the slots for preventing the contraction of the flanges.

4. A gasket comprising elongated openings and means inserted between the longitudinal margins and out of contact with the ends of said openings for preventing contraction of said openings.

5. A gasket having elongated openings, reinforcing rings with flanges contiguous to the edges of said openings, and hollow bracing elements inserted in said flanges between the longitudinal portions of the same.

6. A gasket having elongated openings and annular bracing means inserted into said openings and in engagement with opposite edges and out of contact with the ends of the same, the bracing means being adapted to oppose a minimum of resistance to the flow of any fluid through the openings in the gasket.

7. A gasket having elongated openings and ferrules inserted into said openings, reinforcing rings with flanges in engagement with the edges of said openings over the entire length of said edges, and in engagement with opposite walls of the ferrules.

8. A gasket formed of metallic upper and outer layers and a non-metallic element between said layers, the elements of the gasket being provided with registering openings, a metallic reinforcement applied to the gasket at the edges of said openings, and bracing means spanning said openings and engaging said metallic reinforcement at oppositely located points.

9. A gasket having an inner and outer metallic layer and a non-metallic layer inserted between the same, the gasket being provided with registering openings, reinforcing metallic rings with flanges embracing the margins of said layers at said openings, and hollow metallic braces inserted into said openings and in engagement with the metallic flanges.

10. In a gasket having an elongated opening, a metal ring with a flange having margins extending over opposite sides of the gasket, a metal ferrule inserted in said flange, the metal ferrule having U-shaped cross-section and engaging by the flanges of the U the margins of said first named flange.

In testimony whereof I affix my signature at 10 South La Salle Street, Chicago, Illinois.

FRANK J. OVEN.